July 26, 1966  E. M. LANGWORTHY  3,262,301
METAL FORMING PROCESS
Filed June 12, 1963  2 Sheets-Sheet 2

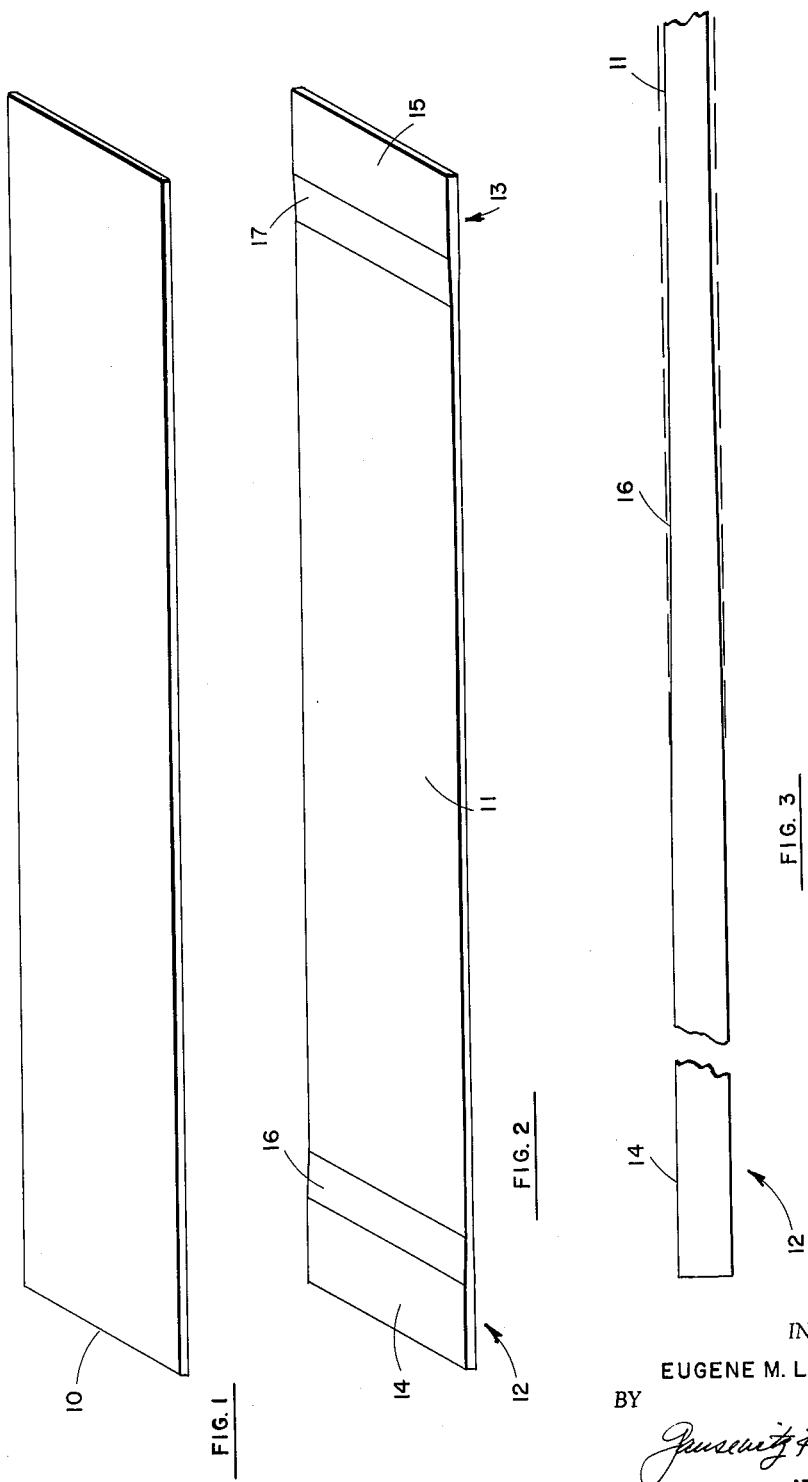

INVENTOR.
EUGENE M. LANGWORTHY
BY
ATTORNEYS

United States Patent Office 3,262,301
Patented July 26, 1966

3,262,301
METAL FORMING PROCESS
Eugene M. Langworthy, Whittier, Calif., assignor to Chemical Contour Corporation, Gardena, Calif., a corporation of California
Filed June 12, 1963, Ser. No. 287,298
9 Claims. (Cl. 72—296)

This invention pertains to the contouring of metal and in particular to an arrangement for forming on a stretch press or the like.

At the present there is widespread industrial use of the stretch press for imparting a curvature to metal parts. It is used extensively in many fields, including the manufacture of aircraft and space vehicles where sheet metal parts frequently must be given precise compound curvatures. Stretch forming is accomplished by gripping opposite edge portions of the part, applying a tension force to the part, and simultaneously bending it around a male die. In this operation the yield point is exceeded so that the completed part assumes the shape of the die.

One serious difficulty in stretch forming, however, has arisen from the creation during the forming operation of stress concentrations in the areas adjacent the jaws. The rate of elongation next to the die normally will equal or exceed that which takes place in the portions of the workpiece which actually are engaged by the die. The high stresses imposed on the workpiece adjacent the jaws frequently causes a tearing of the material at those locations, leading to the scrappage of the part. This not only has increased production costs where stretch forming is involved, but also has limited the field of use of the stretch forming process. Some materials that exhibit a relatively small amount of elongation have not been capable of being formed on a stretch press. This includes materials in a relatively high state of heat treatment. In other instances it has been necessary to form by a series of steps that involves first preforming the workpiece in an annealed condition, after which it is removed from the press and partially heat treated. Following this it is again put in the stretch press to be given its final contour. Afterwards it is aged to final hardness. This repeated handling of the workpiece multiplies the expense of manufacturing and the time of production.

The present invention overcomes the above-noted difficulties, avoiding stress concentrations adjacent the jaws and preventing damage to the workpiece during the stretch forming operation. This is accomplished basically by starting with material slightly thicker and longer than the dimension to be given the completed part. The central section is reduced in thickness to correspond to that desired for the completed part, while at opposite marginal edges the workpiece diverges outwardly to thicker areas which are gripped in the jaws of a stretch press. Then the stretch forming takes place, following which the marginal portions are removed to leave a part having exactly the required curvature, as well as the proper length and thickness.

Therefore, it is an object of this invention to provide an improved metal contouring process.

Another object of this invention is to extend the scope of contouring on a stretch press or similar item of equipment.

A further object of this invention is to avoid stress concentrations adjacent the jaws of a stretch press during the forming operation.

An additional object of this invention is to reduce manufacturing costs while producing parts of improved quality at a faster rate.

These and other objects will become apparent from the following detailed description taken in connection with the accompanying drawing in which:

FIGURE 1 is a perspective view of a workpiece to be given a contour in accordance with the provisions of this invention.

FIGURE 2 is a perspective view, similar to FIGURE 1, after a portion of the thickness of the workpiece has been removed.

Figure 4:
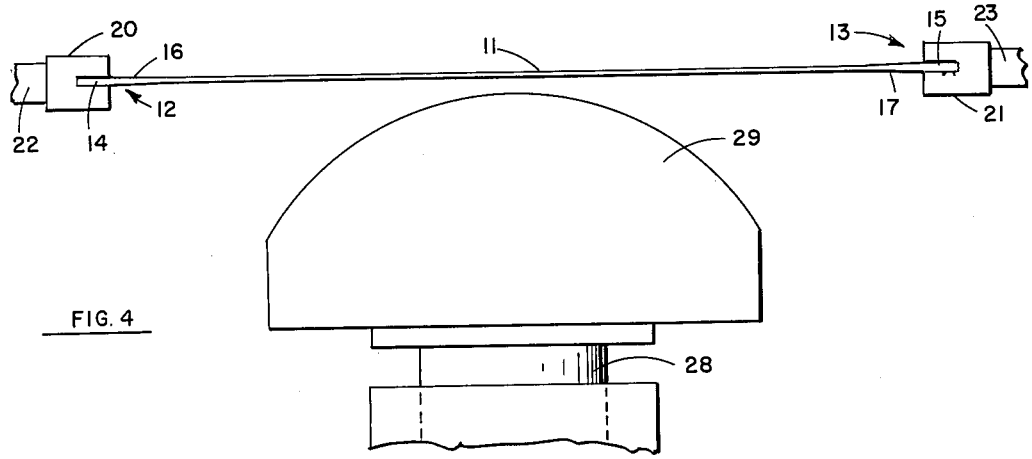
Figure 5:
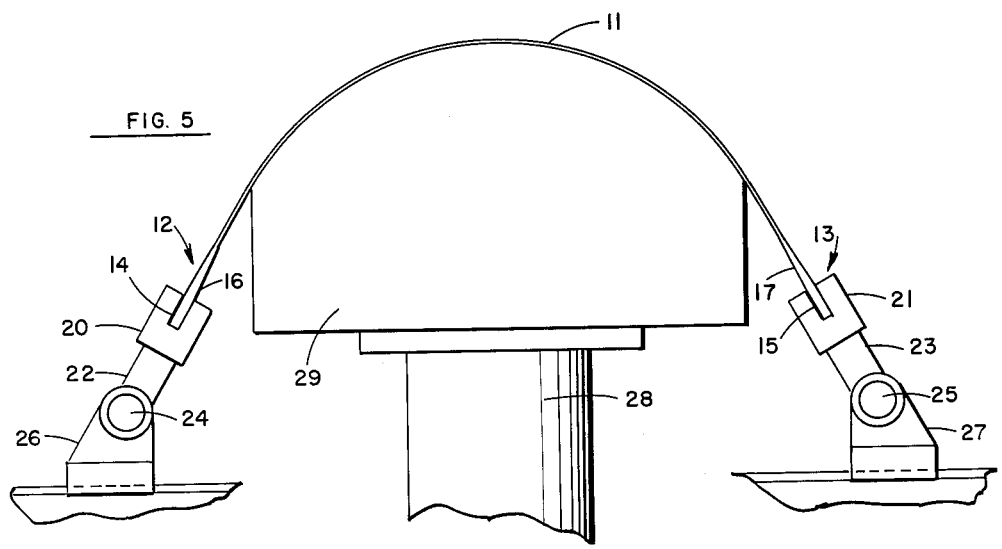
Figure 6:
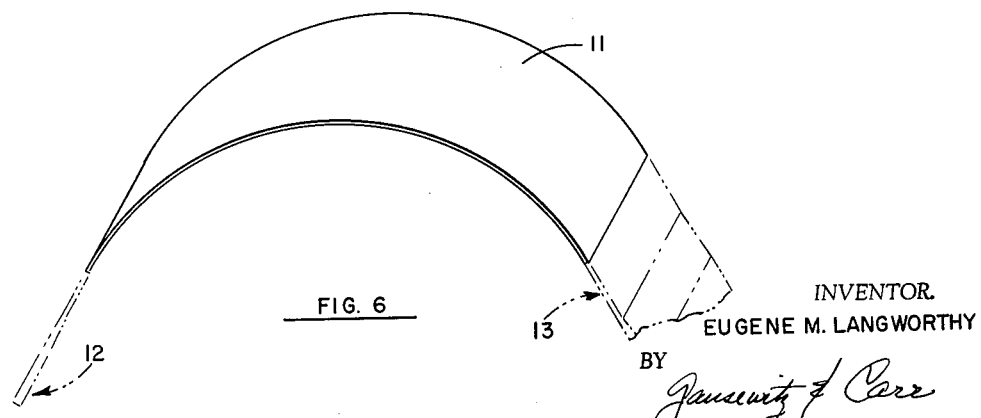

FIGURE 3 is an enlarged fragmentary side elevational view of a marginal portion of the workpiece of FIGURE 2, FIGURE 4 is a side elevational view of the workpiece associated with a stretch press, FIGURE 5 is a side elevational view, similar to FIGURE 4, but showing the workpiece after actuation of the stretch press, and FIGURE 6 is a perspective view of the completed part upon removal of the thickened marginal portions.

With reference to the drawing, a typical workpiece 10 to be formed in accordance with the provisions of this invention is illustrated in FIGURE 1. This may be a sheet of aluminum or other material which will elongate under tension. This sheet of material is slightly thicker than the corresponding dimension for the completed part, and also is a little longer than intended for the completed part. The width may be substantially the same as that of the finished article.

Initially the workpiece 10 is reduced in thickness centrally to achieve the configuration shown in FIGURE 2 and the enlarged fragmentary elevational view of FIGURE 3. In other words, stock is removed from the major central portion 11 of the workpiece leaving the opposite ends 12 and 13 slightly thickened. The entire width of the portion 11 is made thinner in this manner, only the opposite ends, which later are to be held in the jaws of a stretch press, having the greater thickness dimension. The central portion 11 need not necessarily be of uniform thickness, but it will be given substantially the thickness established for the finished part.

The end portions include sections 14 and 15 at the outer edges which are of uniform thickness corresponding to the thickness of the workpiece 10 prior to the removal of any of the material. In addition, there are tapered sections 16 and 17 converging inwardly from the marginal edges 14 and 15 to the central section 11.

The removal of material from the workpiece to define the inner central portion 11 and tapered areas 16 and 17 may be accomplished in any desired manner. This may be by cutting on a conventional machine tool. Chemical milling has been found to be particularly suitable in accomplishing this result.

With the workpiece reduced in thickness, it then is associated with a conventional stretch press as illustrated in FIGURE 4. Such a press may include jaws 20 and 21 carried by movable members 22 and 23 which may comprise piston rods of power cylinders pivotal about horizontal shafts 24 and 25. Supports 26 and 27 mount the shafts 24 and 25. A central ram 28 carries a die 29, the outer surface of which defines the contour to be given the completed part.

The workpiece 10 is engaged in a stretch press as shown in FIGURE 4 so that the jaws 20 and 21 grip the marginal portions 12 and 13. The contact by the jaws is such that the thickened areas 14 and 15 are within the jaws, while the tapered sections 16 and 17 are immediately adjacent the jaws. With the workpiece so arranged, the stretch press is actuated in the usual manner. Thus, the jaws are caused to pull upon the workpiece while the ram 28 moves the die 29 upwardly with respect to the jaws. This stretches the workpiece and wraps it around the die 29 as shown in FIGURE 5. Upon completion of this operation the part is removed from the stretch press, retaining the precise dimension of the die 29. This completes the forming operation with the exception of trimming off its opposite ends to give it the length established for the completed part. This includes removal of a marginal portions 12 and 13 and whatever additional part of the central section 11 is needed to result in the proper length. With removal of sufficient material, including the thickened areas 12 and 13, the workpiece will be given its final length dimension and the finished part will be secured (see FIGURE 6).

When the workpiece is provided with the thickened marginal portions, practically all of the elongation occurs in the central portion where it is needed. Typically, there will be 7% to 8% elongation in the central part 11, while only ½% to 1% elongation occurs adjacent the jaws. This is because the thickened areas 12 and 13 prevent elongation at those areas. In other words, while the yield point will be exceeded in the central area, the marginal portions include more stock and their yield strength will not be reached. Consequently, there are no undue stress concentrations at the margins and this prevents tearing or otherwise damaging the workpiece adjacent where it is held by the jaws. As a result, it is possible to form parts at a higher rate of production because scrappage of parts is reduced significantly. This leads to the lowering of production costs. Moreover, by utilizing the technique of this invention it is possible to stretch form parts that previously either could not be contoured in this manner, or could be formed only by a multiple step process. Parts that are relatively hard and have been given heat treatment nevertheless can be formed in a stretch press without damage. Hence, entire new areas of forming are opened up, and in accordance with this invention it becomes possible to considerably extend the usefulness of stretch forming procedure.

Actually the amount of material removed from the central section 11 of the part may be relatively slight, yet the improved results will be realized. A typical aluminum part which measures 120 inches by 36 inches by .125 inch will have .0045 inch removed from either side of the central portion 11. The marginal portions 12 and 13 of this part have a width of twelve inches. The outer sections 14 and 15 of constant thickness extend inwardly a distance of eight inches, while the tapered sections 16 and 17 are four inches across.

Generally speaking, about ten percent of the thickness of a workpiece is removed from the central portion 11. The inwardly convergent sections normally will be given a taper of a ratio that is approximately one mil per inch of length. Of course, the exact values will depend upon the particular workpiece including its hardness and the extent of elongation it will exhibit under tension. Also the amount of contour to be imparted to it can influence the proportions between the sections of differing thicknesses and the taper between them, as well as the amount of material to be removed from the central portion.

The invention is applicable to all types of stretch forming operations. As illustrated and as described above, the process is utilized in connection with stretch wrap forming in which there is a tension applied to the workpiece prior to the time it is bent about the die. It is equally useful in contouring by the drape forming procedure. In the latter instance, there is no initial pulling on the part, and only the die is actuated to accomplish the bending. Again, however, the part is placed under tension by virtue of the die movement. Hence, simultaneously with the bending, the part is pulled by the resistance of the jaws. As with stretch wrap forming, the reduced central thickness avoids stress concentrations at the jaw areas, and damage to the workpiece is prevented.

The foregoing detailed description is to be clearly understood as given by way of illustration and example only, the spirit and scope of this invention being limited solely by the appended claims.

I claim:
1. The method of producing a curved part of predetermined length and thickness comprising the steps of
   forming a unitary workpiece
      of greater length than said predetermined length of said part to be produced,
      with integral opposite end marginal portions thicker than said predetermined thickness of said part,
      and portions intermediate said ends of said predetermined thickness and at least said predetermined length,
   then contouring said intermediate portions by gripping said opposite end portions and pulling outwardly thereon
      while simultaneously bending said intermediate portions about a die,
   and then removing said end portions from said intermediate portion in an amount sufficient to provide said intermediate portion with said predetermined length.

2. The method of producing a curved part comprising the steps of
   removing from central portions of a workpiece a portion of the thickness thereof
      so as to leave opposite relatively thick marginal portions,
   gripping said marginal portions,
   applying a tension force to said workpiece so gripped
      by pulling outwardly in opposite directions on said marginal portions,
   and simultaneously with said application of a tension force bending said central portions of said workpiece about a die.

3. The method as described in claim 2 in which
   sufficient material is removed from said central portion to give said central portion substantially ninety percent of the thickness of said marginal portions,
      with material being removed from both sides of said central portion.

4. The method of contouring a workpiece comprising the steps of
   removing from central portions of a workpiece a portion of the thickness thereof
      so as to define opposite marginal portions relatively thicker than said central portions,
      said removal of material being such as to provide a tapering section of each of said marginal portions adjacent said central portion,
   then gripping said marginal portions outwardly of said tapered sections in the jaws of a stretch press,
   then contouring said part in said stretch press,
   and then trimming off the ends of said workpiece including said marginal portions to provide a completed part.

5. The method of obtaining a curved sheet metal part of predetermined length and thickness comprising the steps of
   providing a sheet metal workpiece of greater length and thickness than said predetermined length and thickness,
   removing material from the two principal surfaces of said workpiece from a location adjacent but inwardly of one end of said workpiece to a location adjacent but inwardly of the opposite end of said workpiece,
      so as to provide said workpiece with relatively thick opposite end marginal portions,
      said removal of material being of an amount to leave said workpiece with said predetermined thickness,
      and being effected for a length of said workpiece at least as great as said predetermined length,
   then gripping said marginal portions, bending said workpiece around a die while said workpiece is so gripped,
simultaneously with said bending, applying a tension force to said workpiece by pulling outwardly in opposite directions on said marginal portions,
then releasing said workpiece,
and then trimming said workpiece to said predetermined length by removing opposite end portions thereof,
including said relatively thick marginal portions.

6. The method as recited in claim 5 including the step of
removing material from each of said relatively thick marginal portions at a zone inwardly of the outer edge thereof
to form a convergence to said portion of said predetermined thickness,
said workpiece being gripped outwardly of said zones.

7. The method as recited in claim 6 in which
said zones taper inwardly on either principal surface at a ratio of approximately one mil per inch of length.

8. The method as recited in claim 5 in which
said greater thickness is correlated to said predetermined thickness such that approximately ten percent of the thickness of said workpiece is removed in leaving said workpiece with said predetermined thickness.

9. The method of securing a curved sheet metal part of predetermined dimensions and curvature comprising the steps of providing a unitary workpiece having opposite ends capable of being stretched outwardly by pulling thereon in opposite directions and an intermediate portion capable of being wrapped about a die,
said workpiece being formed to have a greater dimension between said ends than that required for a completed part,
integral thickened ends of a greater thickness than that required for a completed part,
and a thickness intermediate said ends and a width dimension transversely of said ends substantially equaling that required for a completed part,
providing a male die complementary to said predetermined curvature,
gripping said ends of said workpiece and stretching outwardly thereon,
simultaneously with said gripping and stretching wrapping said workpiece about said male die,
releasing said workpiece,
and then removing said ends in a sufficient amount to leave a part of said predetermined dimensions.

References Cited by the Examiner

UNITED STATES PATENTS

| | | | |
|---|---|---|---|
| 2,808,501 | 10/1957 | Kilpatrick et al. | 219—154 |
| 2,952,294 | 9/1960 | Beverley et al. | 72—296 XR |
| 3,021,887 | 2/1962 | Maynard | 29—472.1 |

CHARLES W. LANHAM, *Primary Examiner.*

R. D. GREFE, *Assistant Examiner.*